United States Patent
Schyns et al.

(10) Patent No.: US 7,054,013 B2
(45) Date of Patent: May 30, 2006

(54) PROCESS AND DEVICE FOR MEASURING DISTANCES ON STRIPS OF BRIGHT METAL STRIP

(75) Inventors: Marc Schyns, Roclenge-sur-Geer (BE); Cecile Mathy, Liege (BE)

(73) Assignee: Centre de Recherches Metallurgiques, Brussels (BE)

( * ) Notice: Subject to any disclaimer, the term of this patent is extended or adjusted under 35 U.S.C. 154(b) by 386 days.

(21) Appl. No.: 10/380,165

(22) PCT Filed: May 28, 2002

(86) PCT No.: PCT/BE02/00085

§ 371 (c)(1),
(2), (4) Date: Mar. 18, 2003

(87) PCT Pub. No.: WO03/019114

PCT Pub. Date: Mar. 6, 2003

(65) Prior Publication Data
US 2004/0095584 A1 May 20, 2004

(30) Foreign Application Priority Data
Aug. 30, 2001 (BE) .................................. 2001/0567

(51) Int. Cl.
*G01N 21/86* (2006.01)

(52) U.S. Cl. ...................................... 356/602; 356/429

(58) Field of Classification Search ................ 356/429, 356/602–603
See application file for complete search history.

(56) References Cited

U.S. PATENT DOCUMENTS

| 4,322,971 A | * | 4/1982 | Strobel ......................... 73/159 |
| 4,735,508 A | | 4/1988 | Bellio ......................... 356/371 |
| 4,937,445 A | * | 6/1990 | Leong et al. ............ 250/237 G |
| 5,087,822 A | | 2/1992 | Fairlie et al. ................ 250/572 |
| 5,477,332 A | | 12/1995 | Stone et al. ................. 356/371 |
| 5,822,070 A | * | 10/1998 | Syre ......................... 356/419 |

FOREIGN PATENT DOCUMENTS

| WO | WO94/02658 | 2/1994 |
| WO | WO98/21550 | 5/1998 |

* cited by examiner

Primary Examiner—Gregory J. Toatley, Jr.
Assistant Examiner—Kara Geisel
(74) Attorney, Agent, or Firm—Jacobson Holman PLLC

(57) ABSTRACT

Process for measuring distances by optical means on a specular or quasi-specular strip (1) of bright metal, characterised by the following steps:

an incident light beam is emitted by a source (7) incorporated into a measurement head (10), said source projecting a pattern (11) in the form of a plurality of points, preferably a line, arranged along an axis that is essentially perpendicular to the motion direction of the metal surface, in an incidence direction upon a fixed part (5), preferably non-specular, of the installation;

firstly, said beam is partially reflected by said fixed part (5) essentially along the same path as the incident beam and in the opposite direction towards a detector (8) belonging to said measurement head (10) and located in the immediate vicinity of said source (7);

secondly, said beam is partially reflected towards said metal strip (1), from where it is further reflected in the direction of said detector (8).

18 Claims, 7 Drawing Sheets

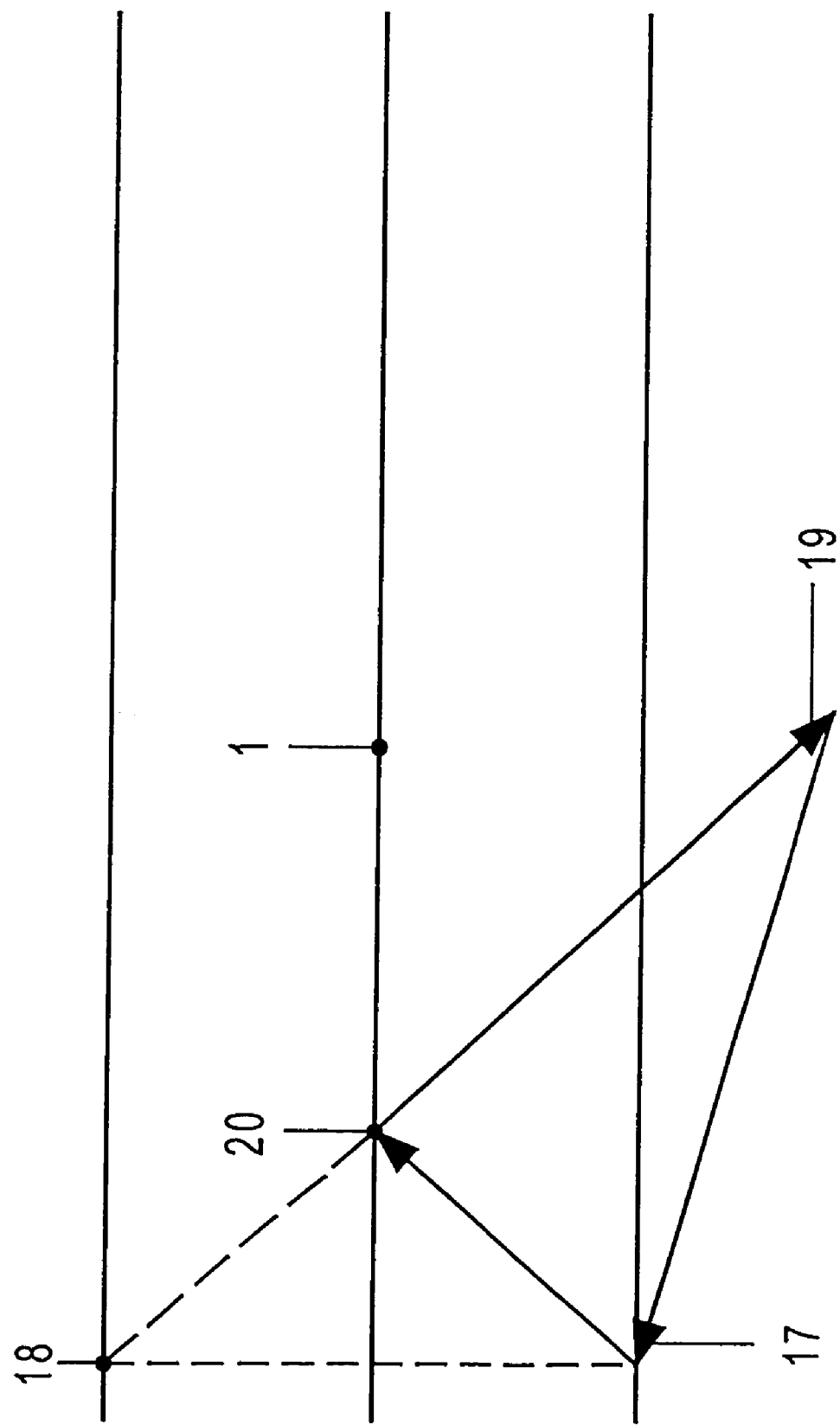

PROCESS AND DEVICE FOR MEASURING DISTANCES ON STRIPS OF BRIGHT METAL STRIP

This is a nationalization of PCT/BE02/00085 filed May 28, 2002 and published in French.

SUBJECT OF THE INVENTION

The present invention relates to a process for measuring distances on strips of bright or specular metal.

In particular, the invention relates to a process for measuring the shape of dip galvanised strips at the outlet of the dryer.

The invention likewise relates to the device for implementing the process.

TECHNOLOGICAL BACKGROUND

The hot-dip production of steel coated with zinc, zinc alloy or iron-zinc alloy or of annealed galvanised steel, called galvannealed steel, has been known for years. The obvious interest in these products in the automotive industry has led to high standards in terms of homogeneity and performance properties of the product in the use of these coated products.

In a hot-dip galvanisation line, the strip emerging at the outlet of the zinc bath is dried using "air knives", which blow compressed air onto the molten zinc taken along by each side of the strip. The pressure of the air knives and the distance between the knife and the strip should ideally be adjusted in real time in such a way that the thickness of the deposit is maintained as close as possible to the desired value on each side of the strip.

With a view to ensuring uniform coating, it is essential to maintain correct shape and position of the strip in motion opposite the lips of the drying apparatus. Indeed, variations in the position of the strip in the direction transverse to the motion direction opposite the knives will produce variation in the thickness of the deposit. These fluctuations in thickness affect the quality of the end product. In particular, in the galvannealing process, variations in the weight of zinc inevitably lead to variations in the iron content of the deposit and consequently to heterogeneity in the properties required by the user.

Owing to thermal and mechanical stresses, instability in the air pressure or structural vibration however, the flatness of the strip moving in front of the lips is not perfect. Significant differences in the thickness of the deposit are observed in the transverse and longitudinal directions.

Owing to the variation in the weight of coating during processing, it is necessary to establish a sufficiently high set point value with a view to obtaining the minimum weight of deposit required by the consumer.

Let us calculate the benefit that a reduction of 1 g/m² in the weight of the zinc coating would produce.

Let T be the number of tonnes produced per year, $E_m$ the average thickness of the strip (in m), P the price per kg of zinc and D the relative density of steel (in kg/m³).

The result is:

| Zinc saved (tonnes/year) | $2T/(D \times E_m \times 1000)$ |
| Zinc saved (kg/tonne of steel) | $2/(D \times E_m)$ |
| Money saved (€/tonne of steel) | $2 \times P/(D \times E_m)$ |
| Money saved (€/year) | $2 \times P \times T(D \times E_m)$ |

For example, if T=350,000 tonnes/year, $E_m$=0.0007 m, D=7,800 kg/m³ and P=0.85 €/kg (1050 $/tonne), the following savings will be obtained through a reduction of 1 g/m²:

Zinc saved: 128 tonnes of zinc/year
Zinc saved: 0.366 kg of zinc/tonne of steel
Money saved: 0.31 €/tonne of steel or 108.5 thousand €/year.

These data show that it is worthwhile searching solutions that are capable of increasing the control of the coating thickness.

PRIOR ART

Many methods can be used to measure distance and shape. Optical methods are often preferred over capacitive and inductive methods inasmuch as they are less sensitive to fluctuations in the constants of the material properties. However, for the specific application of hot-dip galvanising, several factors that may affect the performance of an optical sensor must be taken into consideration.

The main factors considered are as follows:
high reflection coefficient of the strip;
vibration of the supports;
slope of the strip surface relative to the optical axis of the sensor;
variation in the refractive index due to atmospheric conditions (temperature, humidity, pressure);
deposits of zinc vapours on the optical windows.

Since the strip emerging from the drying device has a very reflective surface, particular care must be taken in order to obtain correct measurement. Thus, in the case of smooth (specular) surfaces, the angle of the light rays reflected by the surface is equal to their incidence angle. By contrast, a surface having a rough texture randomly diffuses the incident rays. The surface appears dull because it reflects the light at almost every angle.

In a conventional galvanisation line, the distance between the strip in motion and the lips of the drying device is ranging from 5 to 15 mm. By using a mathematical model previously developed, it is found that instabilities of 1 mm in peak value of the position of the strip between the air knives cause variations of up to 9 g/m² in standard operating conditions. This means that a resolution of 0.1 mm must be reached in order to distinguish fluctuations of 1 g/m² in the coating thickness.

For the above-mentioned range and sensitivity, two main types of sensors are frequently used in contactless metrology applications, namely the laser triangulation sensor and its extension to fringe projection methods and the coaxial or autofocus laser sensor. Laser interferometry is likewise a technique that is customarily used in very high resolution measurement. However, the interferometry methods are sometimes too sensitive. Thus, disturbances in the environment limit the reliability of measurement. Optical fibre displacement sensors are less widely used due to their limited range of measurement.

Triangulation Sensors

Triangulation sensors belong to two categories, the diffuse type and the specular type, respectively.

In the case of diffuse sensors, the laser beam is normally projected onto the target surface and the beam diffused by the target surface is returned to the detector through a lens at the triangulation angle. One advantage of the diffuse sensor is that the laser spot is projected at the same lateral position on the surface, irrespective of the height of the surface. In the case of mirror (specular) surfaces as in the present application, however, such sensors pose a problem because the laser beam is essentially reflected rearwards towards the source optics.

For specular lasers, the laser beam is projected at the same angle relative to the normal of the surface as that of the source optics, which is the collection angle of the receiving optics. The advantage of these sensors is that they can be used for measurements on bright surfaces. However, the laser spot projected onto the surface moves laterally when the distance from the measured surface changes. Another disadvantage is the error or lack of measurement caused by even slightly sloping surfaces. The "cross-bow" or vibration encountered on galvanisation lines may be enough to bring about such situations.

In documents WO-A-94/026 58 and JP-A-55 141 556, such sensors are moved in the direction of the width of the strip in order to evaluate the cross-bow. There are two major disadvantages in this case:
  measurement uncertainties are caused by the translation mechanism (wear, etc.);
  owing to the translation time, a rapid variation in the strip cannot be evaluated.

Projected Fringe Techniques

Images of projected fringes can be formed by various methods. In the general case, a structure in the form of a grid or an interference image is projected onto the test surface. Variations in height lead to a deformation of the projected fringes which, in turn, are compared with the original or with the synthetic grid structure. Most systems for measuring the topography of a surface by fringe projection use a second grid in order to generate Moiré fringes representing contours of more or less equal height. In many devices, CCD cameras, image processing tables as well as microprocessors and computers have been incorporated for automatic analysis of fringes. However, the projection of fringe images is not suitable for measuring specular surfaces, as is the case in the present application.

Autofocus Sensors

Because of the dynamic focussing aspect of autofocus sensors, the spot size is maintained constant whatever the distance between the sensor and the object surface. The light distribution is uniform over the entire spot. Consequently, the resolution of these sensors can be as much as one order of magnitude greater than the resolution of triangulation sensors. However, autofocus sensors do have disadvantages. Owing to the small size of the spot, they tend to cause errors even in the presence of small changes in the surface texture. They are less robust and have a longer response time than triangulation sensors owing to the highly precise mechanical movements that are required to zero the focus error signal.

Optical Fibre Displacement Sensors

These sensors are displacement transducers that use a bundle of glass fibres to transmit and receive light from a target surface. At the end of the probe, the uncollimated rays diverge outwardly from each transmission fibre in a cone shape. The light rays are reflected on the target surface towards adjacent receiving fibres. On the basis of the detection of the intensity of the reflected light, different displacement sensitivities can be created through a combination of light sources, types of fibres, shapes and sizes of fibre bundle, distributions of fibres transmitting and receiving the light and arrangements of bundles transmitting and receiving the light. The smoother the surface, the better the expected performances of the sensor.

There are two types of optical fibre sensors, one depending on reflectivity and the other featuring compensated reflectivity.

Sensors featuring compensated reflectivity are built with at least two bundles of fibres. Each bundle can be considered as being a separate sensor having a sensitivity curve that varies with displacement. Compensation of reflectivity is obtained on the basis of the ratio of the output intensities of these probes with separate fibres. Since the reflectivity of the target changes over a wide range, the output intensities of the individual detectors increase or decrease in proportion, leaving the ratio of the outputs unaffected by the changes in reflectivity. In order to ensure more precise compensation of reflectivity, the target surface within the overall surface of the optical fibre bundle must be uniformly reflective. Usually, it is wisely assumed that, in the case of continuous strips, variations in reflectivity are negligible over the small surface area covered by the optical fibre sensor. Such sensors have a rapid response and are robust, very small and inexpensive. Multiplexing several sensors in order to obtain the shape of the strip in the immediate vicinity of the air knife nozzles may therefore be considered. In the case of galvannealing, the measurements taken with these sensors will not be affected by the strong electromagnetic field generated by the induction heating. However, owing to their proximity to the strip, which is required by the type of measurement (optical fibres) to be performed, there is a risk that zinc vapours will be deposited on the end of the optical fibres, which would interfere with measurement.

AIMS OF THE INVENTION

The present invention aims to provide a solution that does not have the disadvantages of the prior art.

In particular, the invention aims to measure distances between a quasi-specular strip of metal in motion and a fixed device such as, for example, a dryer in a hot-dip galvanisation line.

As a corollary, the invention aims to determine at any given moment both the shape of said metal strip and its displacements in a plane that is orthogonal relative to its motion direction.

The invention additionally aims to reduce, on a hot-dip galvanisation line, the variation in the weight of coating on the strip due, in particular, to the "cupping effect", and at all events to reduce the difference between the set point value and the minimum weight required by the consumer.

Finally, the invention aims to reduce the production costs of a sheet coated by the hot-dip galvanisation process.

MAIN CHARACTERISTIC ELEMENTS OF THE INVENTION

The present invention relates to a process for measuring distances by optical means, preferably by laser triangulation, on a specular or quasi-specular metal strip or surface in continuous motion in an installation, preferably a hot-dip steel galvanisation installation, characterised by the following steps:
  a light beam, referred to as incident beam, is emitted by a source, preferably a laser source, incorporated into a measurement head, said source projecting a pattern in the form of a plurality of points, preferably a line, arranged along an axis that is essentially perpendicular to the motion direction of the metal surface, in a direction of incidence upon a fixed part, preferably non-specular, of said installation;

firstly, said beam is partially reflected by said fixed part, essentially along the same path as the incident beam and in the opposite direction, towards a detector belonging to said measurement head and located in the immediate vicinity of said source;

secondly, said beam is partially reflected towards said metal strip, from where it is further reflected in the direction of said detector.

The detector of the measurement head is advantageously a camera, which receives the image of said projected pattern, on the one hand from said fixed part and on the other hand from the metal strip, each point of the image coming from the metal strip appearing to correspond to a virtual point, which is essentially the point symmetrical with the corresponding point of the incident beam upon said fixed part with respect to a central plane passing through said strip. Moreover, the determination of the position and shape of the strip, preferably in cross-section, are deduced from the image captured by said detector, said measurements being performed in real time.

Still according to the invention, the fixed part of the installation is a dryer at the outlet of the continuous hot-dip galvanisation line, comprising air knives, and the measurement head projects onto this dryer a luminous line that is essentially parallel to the air knives of the latter.

According to a preferred embodiment, the process of the invention is characterised by the following steps:

calibration of the measurement head before the installation is put into operation;
acquisition of images in real time;
processing of the obtained images, taking account of the calibration;
calculation at a plurality of points of the distance between the strip and the drying knives.

Preferably, the calibration is in turn characterised by at least the following steps:

acquisition of an image corresponding to a standard comprising a plurality of horizontal black lines, i.e. lines that are parallel to the lips of the dryer, and a plurality of vertical black lines, i.e. lines that are perpendicular to said lips, said standard being placed in the reflection plane of the light beam on the fixed part of the dryer and marked in relation to a fixed reference point;

extraction of a zone to be processed on the image and conversion of said zone into a two-dimensional greyscale table;

extraction of a plurality of columns from said table, corresponding to fixed abscissae in the zone to be processed;

determination of the position of said horizontal lines by detection of their ordinates at said abscissae;

extraction of several rows from the greyscale table at ordinates calculated as a function of the determined position of said horizontal lines;

determination of the position of said vertical lines by detection of their abscissae at the calculated ordinates;

determination of the equations for the different lines of the grid by polynomial optimisation on the basis of the coordinates obtained in the previous steps;

calculation of the intersections of said horizontal lines and of said vertical lines represented by their equations.

In yet another preferred manner, the process of the invention comprises the following steps:

extraction from said zone to be processed on the image, of the greyscales corresponding to a series of coordinates in accordance with the equation of a vertical line of the calibration process, this operation being repeated for a plurality of virtual vertical lines;

detection of the position of the two laser reflections along these virtual lines;

conversion of the coordinates giving the position of the two laser reflections on the image into real coordinates relative to said reference point;

calculation of the strip position.

To convert coordinates, interpolation is advantageously carried out for a given vertical, i.e. a given abscissa, on a series of ordinates of the intersection points with the different horizontals of the calibration grid, said points having been supplied by the calibration.

In yet another preferred manner, when calculating the strip position, the calculated ordinate of each point on the strip for a given abscissa corresponding to the mid-point of the ordinates of the two said reflections, the abscissa of said points is determined by establishing the equation of the straight line joining the nodal point of the detector, preferably of the camera, to the corresponding point of the virtual image of the laser line and by extracting the point whose ordinate corresponds to said calculated ordinate.

According to another characteristic of the invention, the intensity of the jet of compressed air is controlled in a closed loop and in real time for each knife as a function of the distance between the end of the lip and the strip in order to reduce or minimise the variation in the thickness of the coating on the strip or indeed to ensure that the effective coating thickness is close to a set point value.

According to a particular embodiment of the process of the invention, at least two laser lines are emitted by the source in such a way as to obtain on the detector, preferably the camera, two curves for the first laser reflection and two curves for the reflection on the strip, and the position of each pair of lines is determined as is the distance separating the two lines of the pair, the obtained information being processed in order to determine the slope of said strip.

Another aspect of the present invention relates to a measurement head comprising a laser source and a detection camera, which are adjacent and the axes of which are parallel, in a single protection casing.

The laser and the camera are preferably arranged on a water-cooled mounting plate and the protection casing has an optical window, opposite which an opening for purging the air within the casing is made.

BRIEF DESCRIPTION OF THE FIGURES

FIG. 7 diagrammatically shows the projection of the first reflection in the horizontal plane.

DESCRIPTION OF A PREFERRED EMBODIMENT OF THE INVENTION

Figure 1:
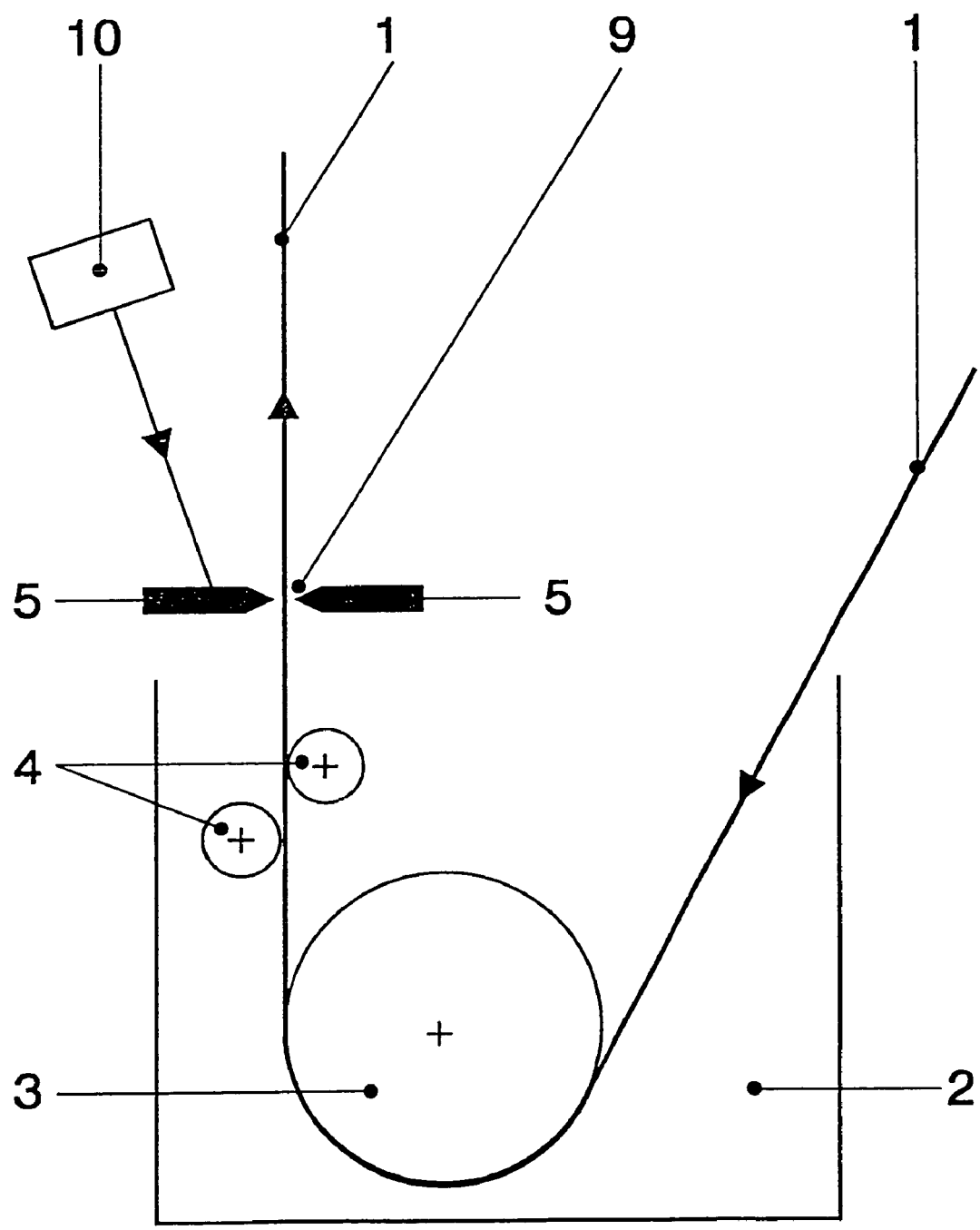
FIG. 1 shows a dip galvanisation installation according to the prior art.

In a conventional hot galvanisation installation such as that shown in FIG. 1, the steel strip 1 enters the bath of molten zinc 2, changes direction at the level of the bottom roll 3 and reemerges from the bath, by passing between rolls 4 for guiding and correcting the shape of the strip. At the outlet of the bath, the strip passes between the knives of a pneumatic drying device intended to ensure the correct thickness of the zinc layer on the end product.

The temperature of the bath is typically 460° C. and that of the strip at the outlet of the dryer 430° C., while that of the environment may reach 100° C.

The bottom roll 3 forces the strip to bend. The tension on the strip then generally causes a "cupping effect" or "cross-bow". Since the profile of the strip is not flat, a variation in the thickness of the deposited zinc layer is observed owing to this lack of flatness, which causes a variation in the distance 9 between the metal and the air knives.

The invention consists in benefiting from or at any event accommodating—the fact that the strip emerging freshly coated from the bath of molten zinc has a specular or quasi-specular surface.

Figure 2:
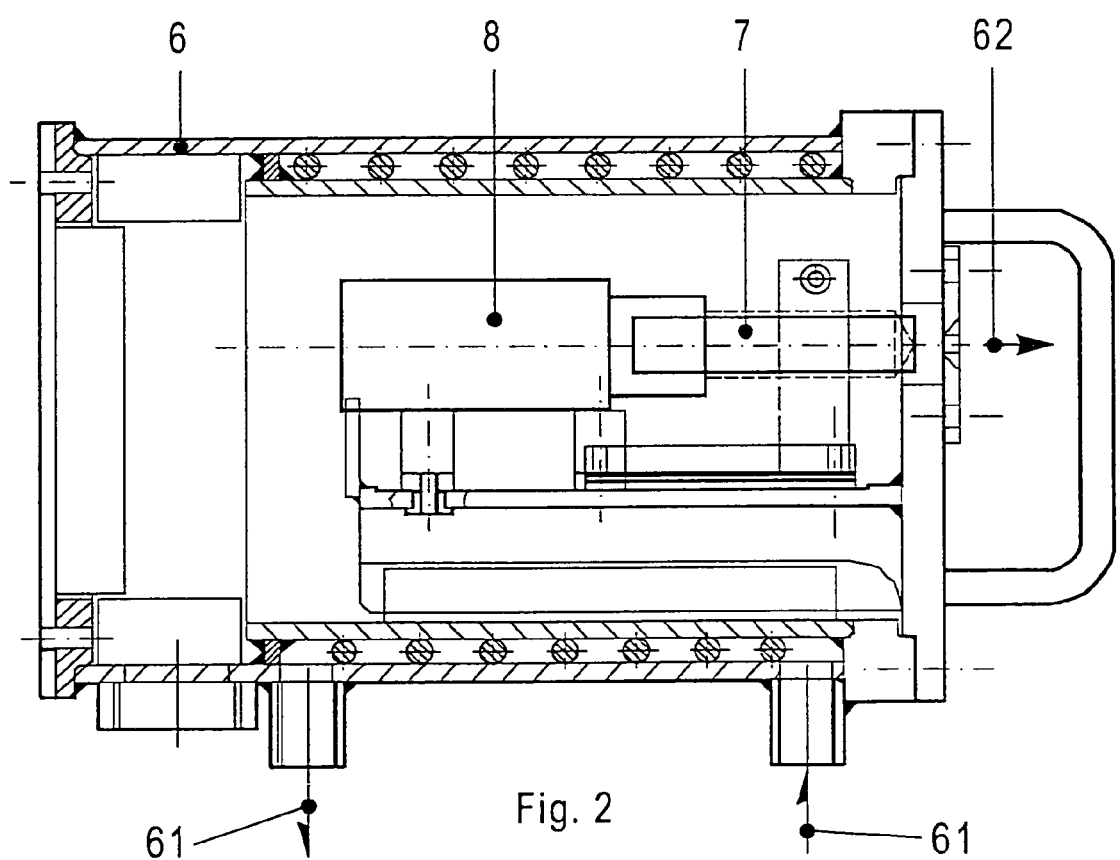
FIG. 2 shows a detection head according to the present invention.

According to a preferred embodiment of the invention, a measurement head 10 comprises a light source 7 and a camera 8 enclosed within a single protection casing 6. FIG. 2 shows the details of the detection head. The laser 7 projects a linear light beam onto the fixed part of the dryer, parallel to the air knives 5.

Figure 3:
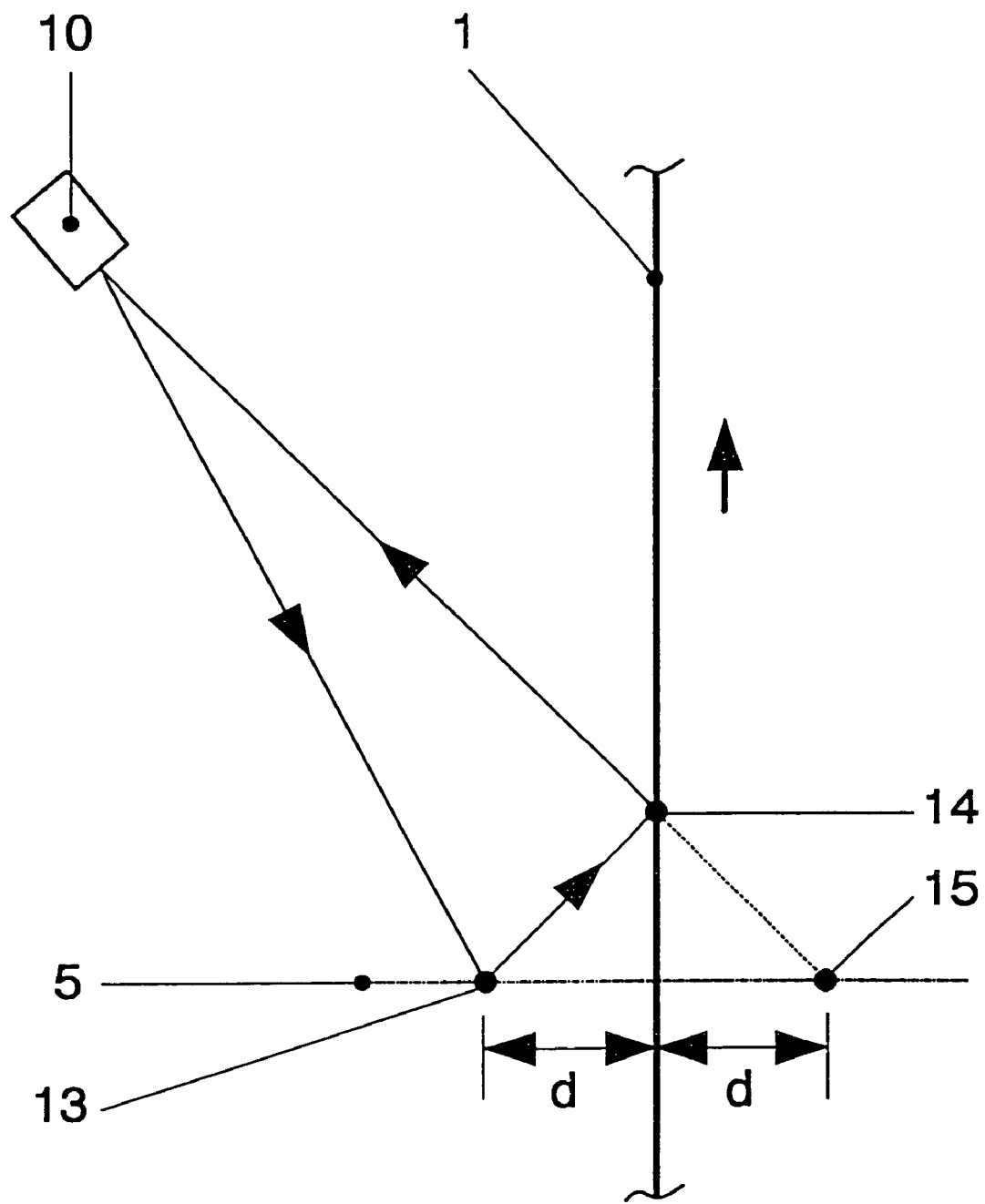
FIG. 3 diagrammatically shows the reflection of light rays in the device according to the invention.

The light beam that has emerged from the measurement head 10 is reflected a first time (13) by this fixed part and then a second time (14) by the strip 1 in motion before being intercepted by the camera, a virtual point 15 being defined by a mirror effect with respect to the strip 1 (FIG. 3).

Figure 4:
FIG. 4 shows an unprocessed video image on a monitor located in the operator's cabin.

Each image acquired by the camera thus contains two lines, as shown in FIG. 4:
- line 11 directly projected by the laser onto a fixed part of the drying device and directly reflected towards the camera;
- line 12 reflected by the coated strip in motion, which appears deformed owing to the cupping effect.

This arrangement has several major advantages:
- with conventional triangulation sensors, it is difficult to perform correct measurements to the extent that the strip in motion is reflective. Indeed, owing to the variation in the position (distance, angle) between the light source and the strip over time, the position of the laser spot that has to be received by the receiver, e.g. a camera, likewise changes, leading at times to receiving too little energy reflected by the surface at the level of the receiver. In fact, this particular aspect does not pose a problem in the case of a rough target surface but is very troublesome for a specular surface. Indeed, the energy distribution lobe is much narrower in the latter case. The signal generated, e.g. an image, may even become undetectable for a non-negligeable time. To try to solve this disadvantage, it is then necessary to increase the power of the laser and/or the gain of the receiver, e.g. a camera, without for all that being sure of the result;
- reduction in the measurement error: owing to the accidental or disturbing relative movements that arise with conventional triangulation between the support of the light source and the support of the receiver, measurement errors may occur. In particular, the sensitivity of the sensor decreases when the angle between the optical axis of the light source and that of the receiver decreases. This source of errors can be reduced by collecting together the two components at a fixed distance within a single casing;
- simplification by a reduction in the number of components: by virtue of the fact that all the heat-sensitive components are in a single enclosure, a single cooling system is required to protect the system.

FIG. 2 shows that the mounting plate for the laser and the camera is cooled by circulation of a fluid 61, preferably water. A neutral gas atmosphere 62, preferably nitrogen, inside the casing is continuously purged via an opening in the casing opposite the optical window. The aim of this purging is twofold: to increase the cooling effect and to avoid deposition of zinc vapours on the optical window.

Figure 5:
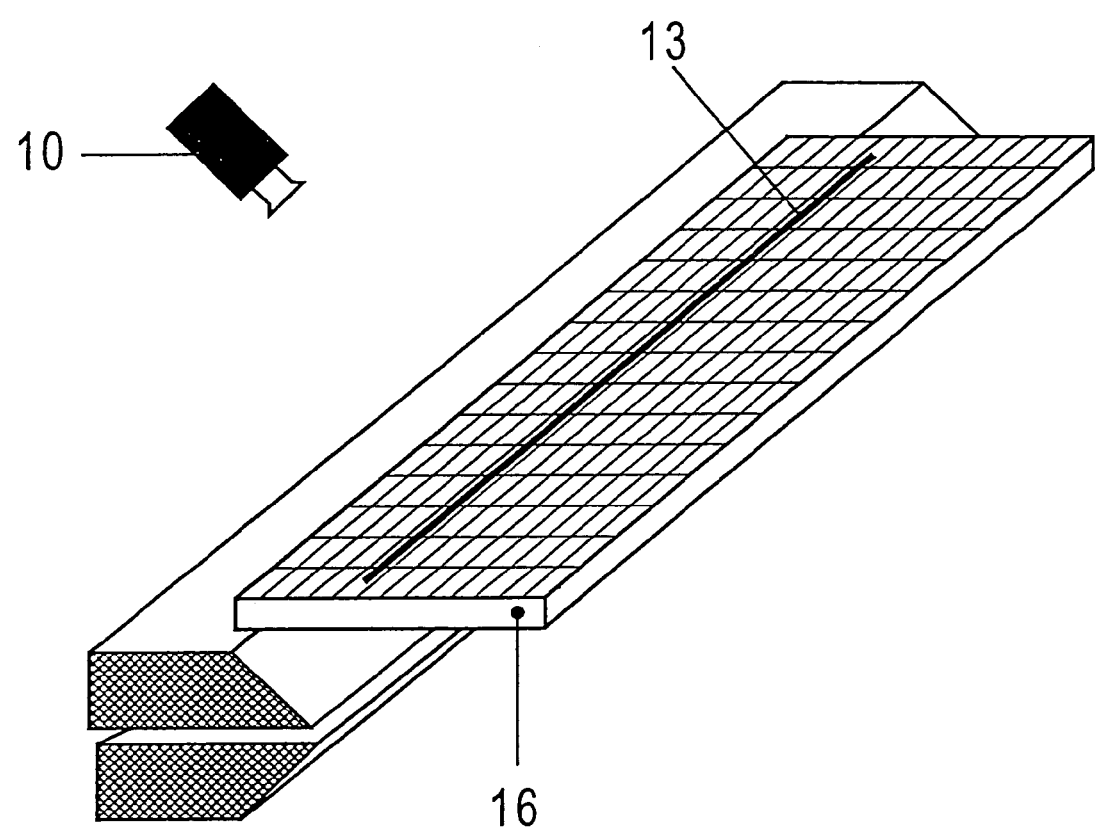
FIG. 5 diagrammatically shows an example of a calibration device for the present invention.

Specific software for processing the acquired images so as to calculate the distance between the dryer and the strip has been developed, and a calibration system has likewise been produced. The calibration device 16 is, for example, a milled surface comprising a certain number of marks (lines), as illustrated in FIG. 5. Calibration is performed before the installation is put into operation.

Thanks to appropriate mounting of the objective diaphragm, the images can be directly used in order to obtain a rough estimate of the strip shape. FIG. 4 shows an example of an unprocessed video image (1600 mm bandwidth). The upper curve in the figures illustrates the "cross-bow" relative to the strip shape, while the lower image is a reference line.

The device of the invention is capable of measuring on-line both the shape and the position of the highly reflective strip moving between the air knives. The device offers the following advantages:
- quick response time;
- lack of contact;
- compatibility with high reflective power;
- low sensitivity to reflection changes of the strip;
- measurement very close to the lips of the drying device;
- low environmental impact.

With the view to reducing variation in the coating, the sensor is integrated into a system for closed-loop control which is capable of adjusting the parameters on-line in such a way that the thickness of the coating is kept close to the set point value.

Two strategies can essentially be followed. The more conventional strategy consists in keeping the strip flat between the air knives by acting on the guiding rolls within the zinc bath as a function of the measurement of the strip shape. Thanks to air knives with variable slits (dynamic air knives, DAK) recently developed, another strategy consists in changing the profile of the drying lips on-line as a function of the measurements of the strip shape with a view to ensuring uniform deposit thickness.

A method known to the person skilled in the art for avoiding variation in the thickness of the zinc deposit on the strip is thus to correct the cupping affecting the strip by changing the position of the adjustment rolls immersed in the bath. This method does not ensure perfect shape correction and is thus not completely effective. Electromagnetic drying is likewise known and has a favourable effect on the stabilisation of the strip, which is performed by straightening the strip by means of electromagnets.

Moreover, it may not be desirable to use these methods insofar as causing "cross-bow" of the strip may be precisely what is desired with a view to obtaining a more stable strip at the outlet of the galvanisation bath.

According to the present invention, the jet of compressed air can also be advantageously adapted as a function of the transverse distance from one end of the strip. Thus, the air knife is transversely subdivided relative to the motion direction of the strip into a series of zones with a variable geometry (not shown). Consequently, the air pressure at the outlet of each individual lip can be adapted and regulated thanks to the process of the invention in such a way as to eliminate almost exactly the excess zinc resulting from the "cross-bow".

The present invention is not limited to the field of hot-coating or of galvanisation of steel sheet but can be applied to the measurement of distances or of shapes in the case of highly reflective or specular strips in motion.

Description of an Example of a Calibrating Process

To take account of the different deformations introduced by the optical system, overall calibration is carried out.

A preferred embodiment example of the calibration system is shown in FIG. 5.

FIG. 5 shows a grid comprising 12 "horizontal" black lines that are parallel to the lips of the dryer, spaced apart by 25 mm and 4 mm in width, and 14 "vertical" black lines that are perpendicular to the lips, spaced apart by 160 mm and 4 mm in width. This grid is placed in the horizontal reflection plane of the light beam on the fixed part of the dryer. Its position is marked relative to a fixed point such as one end of the lips.

Figure 6:
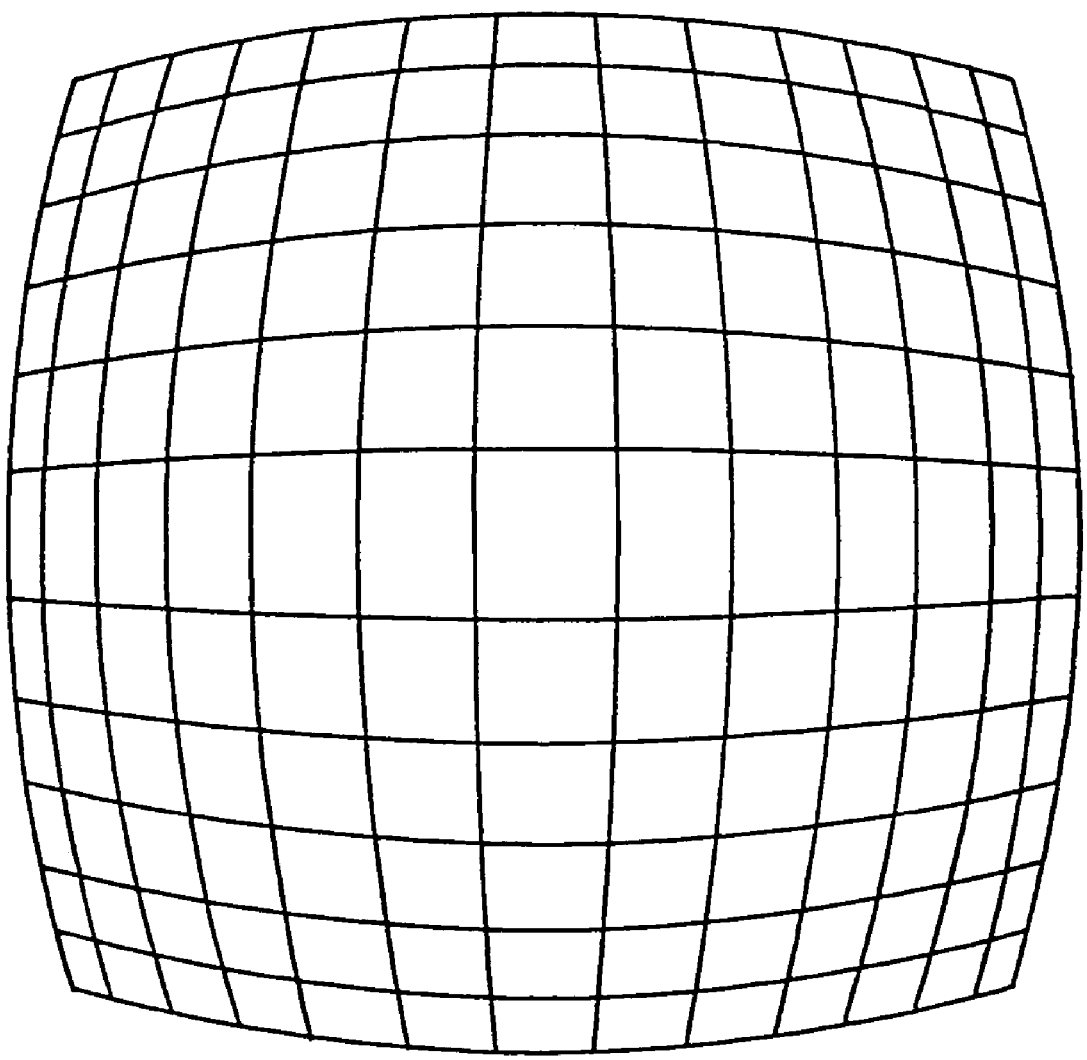
FIG. 6 diagrammatically shows the optical aberration of the camera objective.

Once the grid is in place, an image is acquired. The obtained image is of course not a regular grid but is in fact an assembly of curves which reveal the deformations introduced by the optical system. The result can be as shown in FIG. 6.

Calibration will consist in establishing the correspondence between the real position on the grid and the position in the image. The overall calibration process comprises the following steps:
  recovery of the acquired image;
  extraction of the zone to be processed and conversion into a two-dimensional table, each cell of the table containing the greyscale value of a corresponding pixel;
  extraction of several columns, typically 15, at fixed abscissae in the zone to be processed;
  determination of the position of the 12 horizontal lines by detection of their ordinates at the abscissae under consideration;
  extraction of several rows from the greyscale table at ordinates calculated as a function of the determined position of the 12 horizontal lines, typically between these said lines;
  determination of the position of the 14 vertical lines by detection of their abscissae at the ordinates under consideration;
  determination of equations for the different vertical and horizontal lines of the grid by polynomial optimisation on the basis of coordinates obtained in the previous steps;
  calculation of the intersections of the 12 horizontal lines and of the 14 vertical lines represented by their equations.

Thanks to this calibration, the position marked on an image (in pixels) of a point of the first refection (mark 13, FIG. 3, and mark 17, FIG. 7) of the laser beam can be converted into a real position in mm relative to the reference point.

For the image of the second reflection (mark 14, FIG. 3 and mark 20, FIG. 7) on the strip, the real position of the "virtual image" 15 is obtained in the horizontal plane of the first reflection with this correspondence. The geometrical reasoning used to determine the position of the strip indicates that the ordinate of the point on the strip which has produced a given image corresponds to the mid-point of the ordinates of these two images (see FIG. 3).

However, the abscissa of this point is not the same as that of these two images, except for one point which would be exactly on the axis of the camera. To correct the offset of this abscissa, it is necessary to have the projection coordinates of the nodal point 19 of the camera in the horizontal plane of the first reflection (see FIG. 7).

To determine the position of the nodal point 19 of the objective of the camera 10, use is made of the image acquired for the first part of the calibration. The position and the real distances of the different lines of the grid being precisely known, the resulting distances on the corresponding image are used (2 horizontal lines and 2 vertical lines are sufficient) in order to recalculate the position of the camera which has been able to supply such an image.

Description of an Example of a Detection Process Using the Calibration

The strip position is detected by means of the detection of the position of the two images of the laser beam: the real position for the first reflection and the "virtual" position in the same horizontal plane for the second. Each of these two reflections is in the form of a curve.

The intersection position of the two curves with the virtual vertical lines corresponding to the verticals of the calibration grid is marked on the image given by the camera. These virtual verticals are described by their equation defined during calibration. These positions must then be corrected in order to take account of the deformation introduced by the optical system.

The overall detection process comprises the following steps:
  extraction from the table representing the image, of the greyscales corresponding to a series of coordinates in accordance with the equation of a vertical line from the calibration process: a real vertical line is thus extracted from the image; this operation is repeated for 14 virtual vertical lines;
  detection of the position of the two reflections of the laser beam along these 14 virtual lines;
  conversion of these coordinates giving the position on the image of the two reflections of the laser beam into real coordinates relative to the reference point. To perform this conversion, the procedure is as follows: for a given vertical, i.e. an abscissa, the calibration has supplied a series of ordinates of the intersection points with the different horizontals of the calibration grid. It is thus sufficient to interpolate on this series of points;
  calculation of the strip position:
    1. the ordinate of each of the 14 points is the average of the real ordinates of each of the two reflections;
    2. for the abscissa of these 14 points, the equation of the straight line joining the nodal point of the objective 19 of the camera to the corresponding point on the virtual image 18 of the laser line is established, and the point 20 with the ordinate corresponding to that calculated above is extracted from it (FIG. 7).

According to a particularly advantageous embodiment of the invention, two laser lines are projected instead of a single line as above. The image contains two curves for the two first laser reflections and two curves for the reflection on the strip. For each pair of lines, their position and the distance separating the two lines of the pair are determined. The advantage of splitting the initial laser line into two is that it allows to obtain complementary information after processing of the data as above: the slope of the strip.

The invention claimed is:

1. A process for measuring distances by optical means, on a specular or quasi-specular metal strip or surface in continuous motion in an installation, said process comprising the following steps:
   a light beam, referred to as incident beam, is emitted by a source incorporated into a measurement head, said source projecting a pattern in the form of a line, arranged along an axis that is essentially perpendicular to the motion direction of the metal surface, in a incidence direction upon a fixed part of said installation;
   firstly, said beam is partially reflected by said fixed part, essentially along the same path as that of the incident beam and in the opposite direction towards a detector belonging to said measurement head and located in the immediate vicinity of said source;
   secondly, said beam is partially reflected by fixed part towards said metal strip, from where it is further reflected in the direction of said detector, so that each point of the image coming from the metal strip appears to correspond to a virtual point, which is essentially the point that is symmetrical with the corresponding point of the incident beam upon said fixed part with respect to a central plane passing through said strip.

2. The process according to claim 1, wherein the detector of the measurement head is a camera, which receives the image of said projected patterns coming from said fixed part and from the metal strip respectively.

3. The process according to claim 1, wherein the determination of the position and shape of the strip in cross-section are deduced from the image captured by said detector.

4. The process according to claim 1, wherein said measurements are performed in real time.

5. The process according to claim 1, wherein the installation is a continuous hot-dip steel galvanization installation, and said fixed part of the installation is a dryer comprising air drying knives at the outlet of said installation.

6. The process according to claim 5, wherein the measurement head projects onto said dryer a luminous line that is essentially parallel to the air knives of the dryer.

7. The process according to claim 5, further comprising the following steps:
   calibration of the measurement head before the installation is put into operation;
   acquisition of images in real time;
   processing of the obtained images, taking account of the calibration;
   calculation at a plurality of points of the distance between the strip and the drying knives.

8. The process according to claim 7, wherein said calibration is characterized at least by the following steps:
   acquisition of an image corresponding to a standard comprising a plurality of horizontal black lines that are parallel to the lips of the dryer, and a plurality of vertical black lines that are perpendicular to said lips, said standard being placed in the reflection plane of the light beam on the fixed part of the dryer and marked in relation to a fixed reference point;
   extraction of a zone to be processed on the image and conversion of said zone into a two-dimensional greyscale table;
   extraction of a plurality of columns from said table, corresponding to fixed abscissae in the zone to be processed;
   determination of the position of said horizontal lines by detection of their ordinates at said abscissae;
   extraction of several rows from the greyscale table at ordinates calculated as a function of the determined position of said horizontal lines;
   determination of the position of said vertical lines by detection of their abscissae at the calculated ordinates;
   determination of the equations for the different lines of the grid by polynomial optimization on the basis of the coordinates obtained in the previous steps;
   calculation of the intersections of said horizontal lines and of said vertical lines represented by their equations.

9. The process according to claim 7, further comprising the following steps:
   extraction from a zone to be processed on the image of the greyscales corresponding to a series of coordinates in accordance with the equation of a vertical line of the calibration process, this operation being repeated for a plurality of virtual vertical lines;
   detection of the position of the two laser reflections along these virtual lines;
   conversion of the coordinates giving the position of the two laser reflections on the image into real coordinates relative to said reference point;
   calculation of the strip position.

10. The process according to claim 9, wherein, in order to convert coordinates, interpolation is carried out for a given vertical line, on a series of ordinates of the intersection points with the different horizontals of the calibration grid, said points having been supplied by the calibration.

11. The process according to claim 10, wherein, when calculating the strip position, the calculated ordinate of each point on the strip for a given abscissa corresponding to the mid-point of the ordinates of the two said reflections, the abscissa of said points is determined by establishing the equation of the straight line joining the nodal point of the detector to the corresponding point of the virtual image of the laser line and by extracting the point whose ordinate corresponds to said calculated ordinate.

12. The process according to claim 7, wherein the intensity of the jet of compressed air is controlled in a closed loop and in real time for each knife as a function of the distance between the end of the lip and the strip in order to reduce or minimize the variation in the thickness of the coating on the strip or to ensure that the effective coating thickness is close to a set point value.

13. The process according to claim 1, wherein at least two laser lines are emitted by the source in such a way as to obtain on the detector two curves for the first laser reflection and two curves for the reflection on the strip, and wherein the position of each pair of lines is determined as is the distance separating the two lines of the pair, the obtained information being processed in order to determine the slope of said strip.

14. A measurement head for implementing the process according to claim 1, wherein the measurement head comprises a laser source and a detection camera, which are adjacent and the axes of which are parallel, in a single protection casing.

15. The measurement head according to claim 14, wherein the laser and the camera are arranged on a water-cooled mounting plate and wherein the protection casing has an optical window, opposite to which an opening for purging the air within the casing is made.

16. The process according to claim 1, wherein the light source is a laser.

17. The process according to claim 1, wherein the fixed part is non-specular.

18. The process according to claim 3, wherein the position and the shape of the strip are determined in cross-section.

* * * * *